United States Patent

[11] 3,626,322

| [72] | Inventors | William M. Strouse<br>West Redding, Conn.;<br>Irwin Tobias, New York, N.Y. |
|---|---|---|
| [21] | Appl. No. | 840,302 |
| [22] | Filed | July 9, 1969 |
| [45] | Patented | Dec. 7, 1971 |
| [73] | Assignee | American Optical Corporation<br>Southbridge, Mass. |

[54] METHOD AND APPARATUS FOR ELIMINATING DOMINANCE OR LASER OSCILLATIONS AT ONE WAVELENGTH OVER THOSE AT ANOTHER
2 Claims, 7 Drawing Figs.

[52] U.S. Cl. .................................................. 331/94.5
[51] Int. Cl. .................................................. H01s 3/00
[50] Field of Search ........................................ 331/94.5

[56] References Cited
UNITED STATES PATENTS

| 3,422,370 | 1/1969 | Collins, Jr. ...................... | 331/94.5 |
| 3,468,608 | 9/1969 | Doyle .............................. | 331/94.5 |
| 3,504,982 | 4/1970 | Robieux ........................... | 331/94.5 |
| 3,506,362 | 4/1970 | Doyle et al. ...................... | 331/94.5 |

OTHER REFERENCES

"Simultaneous Laser Oscillator at $R_1$ and $R_2$ Wavelength in Ruby"; Calviello et al.; IEEE Journal of Quantum Electronics; QE 1, No. 3; June 1965 pg. 131.

*Primary Examiner*—Ronald L. Wibert
*Assistant Examiner*—V. P. McGraw
*Attorneys*—William C. Nealon, Noble S. Williams and Robert J. Bird ABSTRACT: Method and apparatus for eliminating in a laser the dominance of laser oscillations at one wavelength of the laser medium over laser oscillations at another wavelength of said laser medium. The cavity of the laser is defined by two mirrors, at least one of which is spherically concave. Helium-neon gas has been mentioned as an example of one laser medium which may be used, and such acts more like a diverging lens upon laser oscillations at 6,401 A. than it does upon laser oscillations at 6,328 A. Because of this effect, if the effective optical spacing between the mirrors of a helium-neon laser is increased from a value at which diffraction losses are low and oscillations at 6,328 A. dominate, a point will be reached at which the diffraction losses for laser oscillations at 6,328 A. become great enough while the diffraction losses for laser oscillations at 6,401 A. remain small enough for laser oscillations at 6,401 A. only to occur. Accordingly, a method and apparatus for obtaining laser oscillations alternately at two closely related wavelengths of a laser medium or alternately at such wavelengths separated by oscillations at both wavelengths are disclosed and achieved by the proper spacing of the opposite mirrors and suitable optical path altering means therebetween.

PATENTED DEC 7 1971 3,626,322
SHEET 1 OF 2
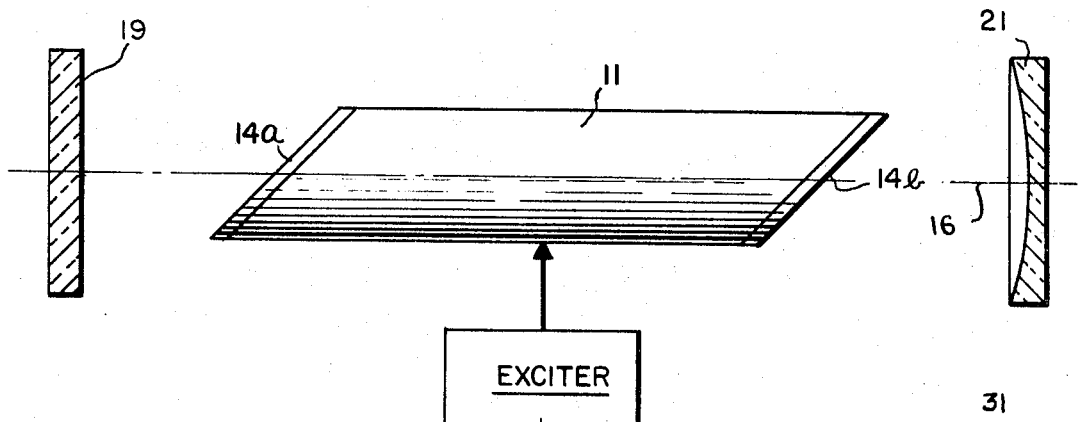
*Fig. 1.*
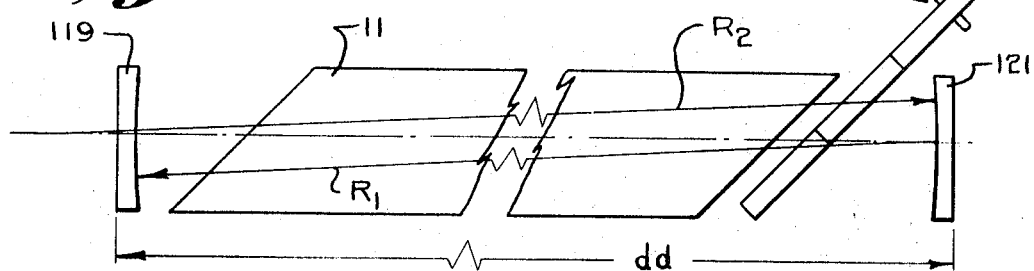
*Fig. 3.b.*
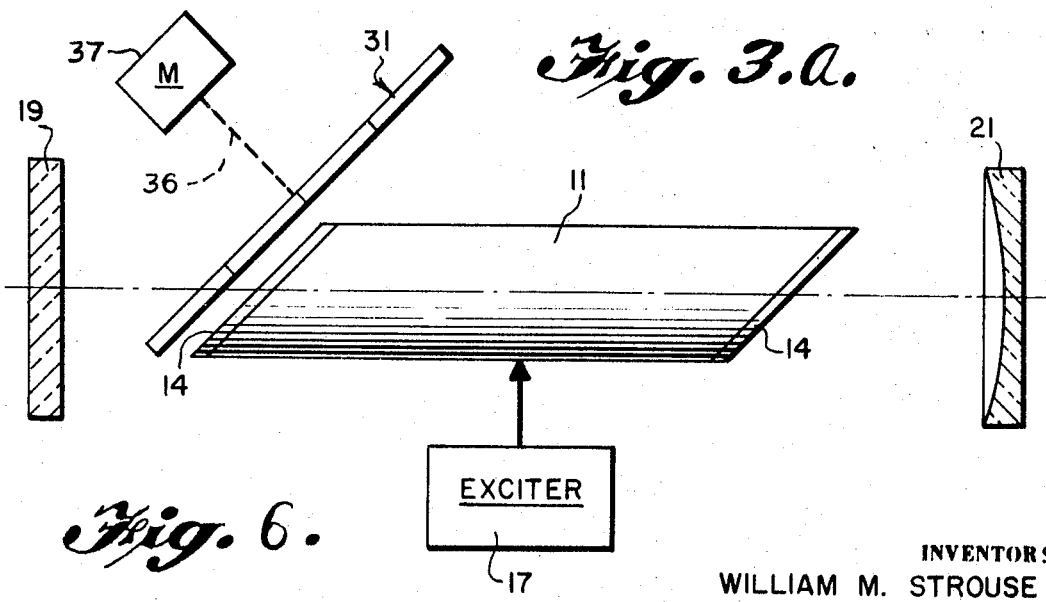
*Fig. 3.a.*
*Fig. 6.*
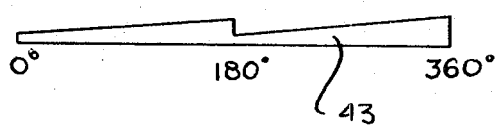
INVENTORS
WILLIAM M. STROUSE
IRWIN TOBIAS
BY *Noble J. Williams*
ATTORNEY

PATENTED DEC 7 1971

INVENTORS
WILLIAM M. STROUSE
IRWIN TOBIAS
BY Noble J. Williams
ATTORNEY

METHOD AND APPARATUS FOR ELIMINATING DOMINANCE OR LASER OSCILLATIONS AT ONE WAVELENGTH OVER THOSE AT ANOTHER

BACKGROUND OF THE INVENTION

This invention relates to lasers and, more particularly to a method and apparatus by which the dominance of laser oscillations at one wavelength over those at another closely related wavelength are overcome.

A helium-neon laser, for example, can be readily arranged to produce laser oscillations at a wavelength of 6,328 A. The presence of oscillations at 6,328 A., however, tends to prevent laser oscillations at 6,410 A., which laser oscillations otherwise could occur. By using prisms to simultaneously misalign the laser cavity for laser oscillations at 6,328 A. and to align the laser cavity for laser oscillations at 6,401 A. the laser can be made to produce laser oscillations at 6,401 A. Because the presence of laser oscillations at 6,328 A. tend to prevent the occurrence of laser oscillations at 6,401 A., the oscillations at 6,328 A. are said to dominate over those at the wavelength of 6,401 A. In accordance with the present invention, this usual condition of dominance is overcome by suitable means and method, without requiring the use of prisms and without the attendant inefficiencies thereof.

SUMMARY OF THE INVENTION

The helium-neon medium in a laser acts more as a diverging lens on laser oscillations at 6,401 A. than it does on laser oscillations at 6,328 A. Because of this phenomenon, as the spacing between mirrors defining a hemiconcentric laser cavity, for example, is increased from a spacing in which the diffraction losses are low, the diffraction losses for laser oscillations at 6,328 A. increase more rapidly than do the diffraction losses for laser oscillations at 6,401 A. When the mirror spacing is set so that the diffraction losses are low for both laser oscillations at 6,328 A, and 6,401 A., laser oscillations at only 6,328 A. will occur in a simple laser cavity as this is the usual condition of dominance. As the spacing between the mirrors is increased by small amounts, the diffraction losses will increase and, accordingly, the intensity of the laser oscillations at 6,328 A. will decrease. Because the diffraction losses for laser oscillations at 6,328 A. increase more rapidly than do those for laser oscillations at 6,401 A., a point will be reached at which laser oscillations of 6,401 A. will begin to occur. As the mirror spacing is further increased from this point, the intensity of the oscillations at 6,401 A. will increase and the intensity of the oscillations at 6,328 A. will continue to decrease. Thus, by properly setting the mirror spacing, laser oscillations at both 6,401 A. and 6,328 A. can be obtained. As the mirror spacing is still further increased, laser oscillations at 6,328 A. will cease entirely and only laser oscillations at 6,401 A. will be present. Thus, by properly setting the mirror spacing in a simple hemiconcentric cavity, laser oscillations at 6,401 A. can be obtained and the more usual condition of dominance in a helium-neon laser at 6,328 A. will be overcome.

While a hemiconcentric laser cavity formed by a plane mirror and a spherical mirror which are properly spaced apart may be used in carrying out the invention, it is also possible to employ two generally similar spherical mirrors but of unequal radii for the same purpose. Additionally arranged to function with either arrangement will be optical path altering means presently to be more fully described.

Accordingly, an object of the present invention is to provide means and method for overcoming the usual condition of dominance of laser oscillations at one particular wavelength over those at another wavelength in such a way that both may be alternately provided, or both may be alternately provided but separated from each other by intervals when laser oscillations at both wavelengths are present.

Another object of the present invention is to overcome in a helium-neon laser the more usual condition of dominance of laser oscillations at 6,328 A. over those at 6,401 A. and thereby provide alternately laser oscillation at both wavelengths, either separated or not, by periods of simultaneous oscillations at both wavelengths.

A still further object of the present invention is to provide a method and apparatus for switching between conditions in which laser oscillations occur at 6,328 A. alone, at 6,401 A. alone and at both 6,328 A. and 6,401 A. simultaneously.

Further objects and advantages of the present invention will become readily apparent as the following detailed description of the invention unfolds, when taken in conjunction with the drawings, in which:

FIG. 1 is a schematic diagram illustrating a laser system which may be used in carrying out the present invention;

FIGS. 3a and 3b illustrate two different laser systems for alternately switching between the laser oscillating conditions with respect to two closely related intensities of laser oscillations;

FIG. 6 is a 360° profile showing of another modified wheel which may be used in the laser system of the invention.

DESCRIPTION OF THE STRUCTURAL EMBODIMENTS OF THE INVENTION

Figure 2:
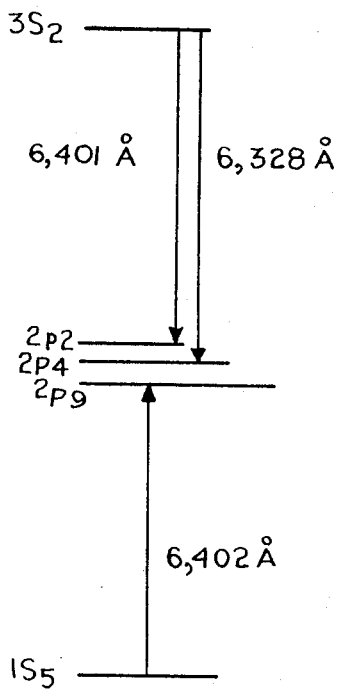
FIG. 2 is an energy level diagram for neon for use in explaining principles of the present invention.

Shown in FIG. 1 is a gas laser comprising a tube 11 containing a mixture of an active gas such as neon, and an auxiliary gas, such as helium. The tube is closed at its opposite ends by transparent windows 14a and 14b, which, in order to reduce light reflections, are inclined at Brewster's angle to the laser axis 16. The light beam which is produced by the laser will be propagated generally parallel to this axis. An exciter 17 coacts with the tube 11 in known manner to produce an electrical discharge in the gaseous laser medium within the tube 11. Mirrors 19 and 21 are positioned outwardly of the opposite ends of the tube 11. The mirror 19 is flat or, in other words, has a radius of curvature equal to infinity and is positioned perpendicular to the axis 16 and thus generally perpendicular to the laser beam being generated by the laser. The mirror 21 is spherically concave and is also positioned on the axis 16 and perpendicular thereto. One of the mirrors 19 and 21 is made partially transmissive in order to transmit the light beam generated by the laser during utilization of the device. The space included between the mirrors 19 and 21 and occupied by the laser tube 11 is referred to as the laser cavity.

A helium-neon laser normally produces light with a wavelength of 6,328 A. but can be made to produce light of a wavelength of 6,401 A. When the neon-helium gas mixture is excited by an electrical discharge, the neon atoms will be excited to higher energy levels from which the neon atoms will emit light upon relaxation to lower energy levels as is illustrated in the neon energy level diagram of FIG. 2. Because of the presence of helium, a large number of neon atoms will be excited to $3s_2$ energy level. When a neon atom relaxes from the $3s_2$ energy level to the $2p_2$ energy level, it will emit a light having a wavelength of 6,401 A. When a neon atom relaxes from the $3s_2$ level to the $2p_4$ level, it will emit light having a wavelength of 6,328 A. Because of the presence of helium in the medium, there will be more neon atoms at the $3s_2$ level than there will be at the lower energy $2p$ energy levels. This condition is known as a population inversion.

When this population inversion occurs, relaxation from the $3s_2$ energy level to the $2p$ energy levels can be stimulated by light of the same wavelengths as that which is emitted as the result of the relaxation. Thus, light of the proper wavelength incident on the gaseous medium within the tube 11 will cause light to be emitted by this medium. This emitted light will be in phase with the incident light. In the absence of light applied externally to the medium, light emitted by spontaneous relaxations from the $3s_2$ level to the $2p$ levels will stimulate further light emissions. This stimulated emission adds to the stimulating light so that the spontaneously emitted light in the medium experiences amplification as it travels through the medium. The elongated geometry of the tube 11 containing the laser medium establishes a preferred direction for the light along the axis of the tube so that light is emitted from the ends of the tube through the transparent plates 14. The light emitted from the tube through the plates is reflected back into the tube by the mirrors 19 and 21 thereby stimulating additional emissions in the laser medium within the tube 11 and further increasing the intensity of the light generated. As a result, standing waves of light energy or laser oscillations are set up in the cavity defined between the mirrors 19 and 21.

The above-described helium-neon laser will normally produce laser oscillation of 6,328 A. rather than at 6,401 A. because the oscillation at 6,328 A. lowers the number of atoms at the $3s_2$ level below the threshold value required to sustain oscillations at wavelength of 6,401 A. It has previously been demonstrated that oscillations at the 6,401 A. wavelength can be generated by inserting in the cavity prism means oriented so that the cavity is simultaneously misaligned for 6,328 A. and aligned for 6,401 A. It has further been demonstrated that laser oscillation can be achieved at 6,401 A. alone, 6,328 A. alone, or at both 6,401 A. and 6,328 A. simultaneously in a simple laser cavity without the use of prisms by carefully making small changes in the spacing between the mirrors 19 and 21.

When the spacing $d$ between the mirrors 19 and 21 is set to be less than the radius of curvature $R_1$ of the mirror 21, the diffraction losses in the cavity are low and laser oscillations can be sustained. When the spacing between the mirrors is greater than the radius of curvature of the mirror 21, then the diffraction losses are high and laser oscillations cannot be sustained.

If the mirror spacing is selected to be materially less than the radius of the curvature of the mirror 21, high intensity oscillations will occur at the wavelength of 6,328 A., and no oscillations will occur at the wavelength of 6,401 A. for the reasons explained above. This is the normal manifestation of dominance in a helium-neon gas laser. As the spacing $d$ between the mirrors increases, the diffraction losses will increase and the intensity of the laser oscillations will decrease. It would be expected that as the spacing is further increased, the intensity of the laser oscillations would continue to decrease and eventually cease entirely. This is, in fact, what happens to the laser oscillations at the wavelength of 6,328 A.

The present invention, however, is based on the discovery that as the mirror spacing for the laser oscillating at 6,328 A. is increased, at a certain spacing of slightly less than the radius of curvature of the concave mirror 21, laser oscillations will begin to occur at the wavelength of 6,401 A. along with the laser oscillation at the wavelength of 6,328 A. As the mirror spacing is further increased from this point, the intensity of the laser oscillations at the wavelength of 6,328 A. will decrease and the intensity of the oscillations at 6,401 A. will increase until a point is reached at which the laser oscillations at the wavelength of 6,328 A. will cease entirely and only laser oscillations at the wavelength of 6,401 A. will continue. If the mirror spacing is increased still further, the laser oscillations at the wavelength of 6,401 A. will decrease and eventually cease. Thus, if the spacing between the mirrors 19 and 21 is properly set, the dominance of the helium-neon laser oscillations at 6,328 A. over those at 6,401 A. can be overcome and laser oscillations either at the wavelength of 6,401 A. alone or at both the wavelengths simultaneously can be achieved.

The usual dominance of the laser oscillations at the wavelength of 6,328 A. over those at the wavelength of 6,401 A. is overcome at the proper mirror setting because of the property of the excited helium-neon medium acting more as a diverging lens upon laser oscillations at the wavelength of 6,401 A. than upon laser oscillations at the wavelength of 6,328 A. If a converging lens is placed in the cavity between the mirrors 19 and 21 optically aligned with the laser beam, higher diffraction losses occur at smaller mirror spacings. The mirror spacing above which the high diffraction losses prevent laser oscillation from being sustained and below which the lower diffraction losses permit laser oscillations to be sustained is, in effect, increased when a diverging lens is placed in the cavity between the mirrors 19 and 21.

The mirror spacing defining the boundary between the conditions of preventing laser oscillations and permitting laser oscillations shall be referred to as the boundary mirror spacing. A converging lens placed in the cavity between the mirrors has the opposite effect of a diverging lens and, in effect, decreases the boundary mirror spacing.

Since the excited helium-neon medium acts like a diverging lens on laser oscillations at the wavelength of 6,401 A. but does not so act on laser oscillations at the wavelength of 6,328 A., the boundary mirror spacing for laser oscillations at 6,401 A. will be increased by the lens action of the medium but the boundary mirror spacing for laser oscillations at the wavelength of 6,328 A. is not changed. Moreover, as the mirror spacing is increased approaching the boundary mirror spacing for laser oscillations at 6,328 A., the diffraction losses for laser oscillations at 6,328 A. will increase more rapidly than the diffraction losses for laser oscillations at 6,401 A. Accordingly, as the laser spacing is increased approaching the boundary mirror spacing for laser oscillations at 6,328 A., the intensity of 6,328 A. will decrease and the population of the neon atoms at the $3s_2$ energy level will increase to the threshold level at which laser oscillations at 6,401 A. begin to occur. Further increase in the mirror spacing further decreases the intensity of oscillations at 6,328 A., thus further increasing the population of neon atoms at the $3s_2$ energy level. Thus, the intensity of oscillations at 6,401 A. increases. Oscillations occur at both the wavelengths of 6,328 A. and 6,401 A. until the spacing is increased beyond the boundary mirror spacing for laser oscillation at 6,328 A. When the mirror spacing has been increased beyond this point, laser oscillations at the wavelength of 6,401 A. alone will continue. As the mirror spacing is increased still further it will approach the boundary mirror spacing for a laser oscillation at 6,401 A. and the intensity of the oscillations at this wavelength will decrease and then cease as the spacing is increased beyond this boundary mirror spacing.

The reason the helium-neon medium acts more as a diverging lens upon laser oscillations at 6,401 A. than it does upon laser oscillations at 6,328 A. is the presence in the medium of neon atoms at the $1s_5$ energy level. An absorptive transition at the wavelength of 6,402 A. involves this energy level and the $2p_9$ level as illustrated in the energy diagram of FIG. 2. Because of this energy transition, the presence of neon atoms at the $1s_5$ energy level decreases the refractive index of the medium at the wavelength of 6,401 A. It is assumed that the density of the atoms at the $1s_5$ energy level decreases monotonically from the center of the tube 11 to the walls thereof. As a result, the medium acts as a diverging lens on laser oscillations at the wavelength of 6,401 A. This lens effect does not apply to laser oscillations at the wavelength of 6,328 A. Thus, the medium acts more like a diverging lens upon laser oscillations at 6,401 A. than upon laser oscillations at 6,328 A.

Instead of actually changing the spacing $d$ of the mirrors 19 and 21 in order to switch between conditions of laser oscillation at the wavelength of 6,328 A. and at the wavelength of 6,401 A., a plane-parallel plate of transparent material of a different index of refraction than air could be used between the mirrors. For example, if the distance between the mirrors is initially set so that only laser oscillations of 6,401 A. are obtained and then a plane-parallel plate of suitable thickness and of an index of refraction higher than the air which it displaces is introduced into the cavity, it will alter the effective optical length of the cavity such that laser oscillations at 6,328 A. are produced. Depending on the thickness of the plate either oscillations at 6,328 A. alone or at both 6,328 A. and 6,401 A. together can be obtained while the plate is in place.

Figure 4:
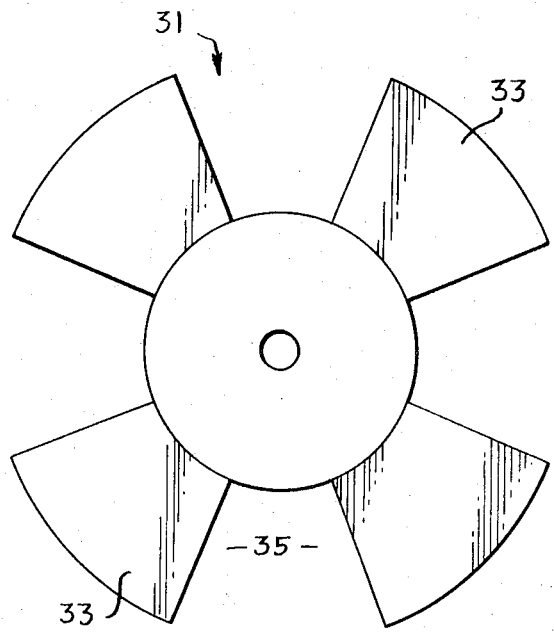
FIG. 4 illustrates in plan view a rotatable component which may be used in the system in FIG. 3a or 3b.

Thus, in accordance with the present invention, FIG. 3a illustrates an embodiment in which a rotatable transparent chopper wheel is used between mirrors 19 and 21 to cyclically switch the laser oscillations of gas laser 11 back and forth between 6,328 A. and 6,401 A. The chopper wheel 31, which is better illustrated in the plan view of FIG. 4, contains a plurality of sector-shaped transparent blades or plates 33 evenly circumferentially distributed about the wheel 31. The plates or blades have a higher predetermined index of refraction than the displaced air. Gaps 35 are defined in the wheel between the plates 33. The wheel is positioned in the cavity of FIG. 3a so that as it rotates on its axis 36, the laser beam will be alternately required to pass through the plates 33 and then through the gaps 35 therebetween. The wheel 31, like the windows 14, is inclined at Brewster's angle to minimize reflection from its surfaces. Thus, since the mirrors 19 and 21 are spaced so that only laser oscillations at the wavelength of 6,401 A. are produced when the beam passes through an air gap 35 in the chopper wheel, and since the thickness of the blades 33 are selected so that when a blade 33 is in the path of the laser oscillations, only laser oscillations at the wavelength of 6,328 A. are generated, alternate conditions can be produced. A motor 37 is provided for rotating the chopper wheel 31. Therefore, as the chopper wheel rotates, the laser oscillations will be cyclically switched between the wavelengths of 6,401 A. and 6,328 A.

As a slight modification, it would be possible to adjust the thickness of the chopper blades 33 so that alternate switching of laser oscillations between 6,401 A., on the one hand, and 6,401 A. and 6,328 A. combined, on the other hand, will be provided during rotation of the motor 37. Or, the spacing of the mirrors 19 and 21 could be so selected that laser oscillation of 6,401 A. and 6,328 A. combined will occur when no blade 33 interrupts the laser beam between the mirrors 19 and 21 and the thickness of the chopper blades 33 so chosen that when any one is in the path of the laser beam, only laser oscillation at 6,328 A. will occur.

Figure 5:
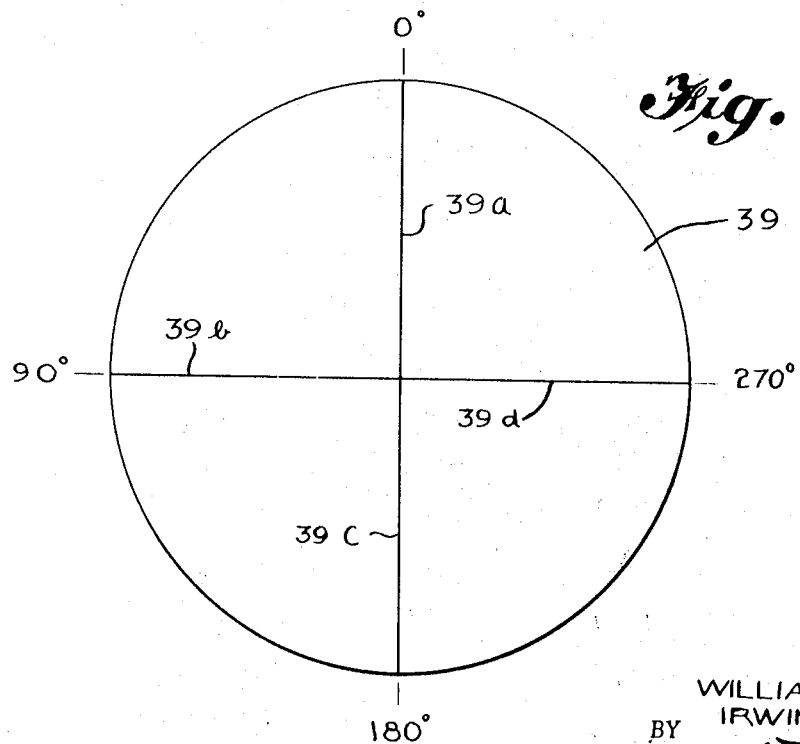
FIG. 5 illustrates a plan view of a modified component which may be used in the system of FIG. 3a or FIG. 3b.

In another embodiment, a different wheel 39 (see FIG. 5) may be placed in the laser cavity between the mirrors 19 and 21. This wheel is in the form of a circular transparent plate which gradually varies in thickness through different like portions of the plate, considered along a 360° path about its axis, through which the laser beam is to pass. This transparent platelike wheel 39 has a greater predetermined index of refraction than the air which it displaces. The wheel 39 is made to vary gradually in thickness controlled amounts and, as shown, in effect provides a series of similar wedge-shaped sectors having thicker parts substantially at 0°, 90°, 180°, and 270° along a circular path about its axis of rotation and is stepped adjacent thereto as indicated at 39a, 39b, 39c, and 39d so as to have like thinner parts adjacent thereto. Furthermore, these variations in thickness would be so controlled as to function in the laser cavity between mirrors 19 and 21 in switching the laser oscillations between 6,401 A. only and 6,328 A. only, or between 6,401 A. only and 6,401 A. and 6,328 A. combined, or between 6,401 A. and 6,328 A. combined and 6,328 A. only.

In FIG. 6, a 360° edge or circumferential profile view of a slightly modified form of wheel 43 which may be employed in the laser cavity is shown. This wheel has instead two stepped portions between thicker and thinner parts 180° apart, but would be employed in much the same manner as wheel 39 in switching between any two of the laser oscillation conditions mentioned above. (A wheel of any convenient number of steps desired may be used.) Wheel 43 would be mounted in the cavity and driven by the motor 37 in the same manner as mentioned above for wheel 31 or wheel 39. As such a wheel is rotated in the cavity, the ratio of the intensity of laser oscillations at 6,328 A. to those at 6,401 A. will vary as a function of the annular position of the wheel in the cavity.

In FIG. 3b is shown a laser system much like that of FIG. 3a but which employs two concave spherical mirrors 119 and 121 adjacent the opposite ends of the laser 111 to establish a laser cavity. Instead of using one plane mirror and one concave spherical mirror as in FIG. 3a, in hemiconcentric relation to each other, here the two spherical mirrors have radii of different lengths, with the radius $R_1$ of mirror 119 substantially equal to the axial distance $dd$ between the mirrors and the radius $R_2$ of mirror 121 greater than $dd$. Nevertheless, the values of $R_1$ and $R_2$ can be selected such that the optimum conditions for laser oscillation at two closely related wavelengths of the laser medium employed can be arrived at. Of course, when the medium is helium-neon $dd$ $R_1$ and $R_2$ will be adjusted for laser oscillation at 6,401 A. and 6,328 A.

Instead of using a plane-parallel chopper wheel or a thickness varying plate to switch the conditions of laser oscillation, a deformable mirror, the radius of curvature of which can be varied by motor means or the like could be used to achieve transition between two conditions at which laser oscillations, such as at 6,328 A. and 6,401 A., are obtained. In this instance, instead of varying the absolute spacing between the mirrors, the spacing between mirrors relative to the radius of curvature of at least one mirror is varied.

In the above-described specific embodiments, the laser medium is neon-helium gas and involves laser transitions at 6,328 A. and 6,401 A. The principles of the invention are also applicable to other laser media and laser transitions at other wavelengths related thereto. However, the cavity must contain a laser medium having such absorptive properties that it acts as a stronger lens, either divergent or convergent, for laser oscillations at one of the closely related wavelengths at which laser transitions can be produced than it does for laser oscillations at another wavelength at which laser transitions can be produced. The absorptive properties may be in the laser medium itself as in the above-described specific embodiment or it may be in other media also introduced into the laser cavity. Switching between laser oscillations at the different wavelengths of the laser medium can then be achieved simply by varying the effective optical spacing between the mirrors by rotatable optical space-varying means as described above.

It will be appreciated, of course, that the laser structure can be arranged in known fashion to emit optical energy at the laser emission wavelengths outwardly through the mirror at either end of the structure, or outwardly through both ends of the structure simultaneously, as desired.

The above-described systems and methods are preferred embodiments of the invention and many modifications may be made thereto without departing from the spirit and scope of the invention as defined in the appended claims.

Having described out invention, we claim:

1. A laser light-generating system comprising a component of laser material, a pair of optically aligned reflectors disposed in predetermined spaced facing relation to each other at opposite sides of said component and defining therebetween an optical resonant cavity including said component, said laser material having at least two different closely related inherent conditions of laser oscillation when suitably pumped to an excited energy level, means for pumping said laser material to said excited energy level, at least one of said reflectors being partially transmissive to optical energy to the closely related laser oscillation wavelengths of said laser material, a rotatable chopper wheel disposed adjacent said cavity and having a plurality of spaced segments arranged so as to be successively projected into said cavity when said wheel is rotating, the predetermined spacing of said reflectors being so exactly controlled as to provide an optical path value therebetween and including said laser component but no segment which is such that laser oscillation at only one of said inherent conditions of laser oscillation will occur, said segments being formed of a transparent material of a predetermined refractive index and of such carefully controlled thickness as to provide between said reflectors and including said laser component and any one of said segments an optical path value which is such as to allow only the other of said inherent conditions of laser oscillation to occur, and motor means for rotating said wheel for successively projecting said segments into said cavity and into alignment with said laser component.

2. A laser system as defined in claim 1 wherein said laser material is a helium-neon gas providing a first laser oscillation condition at 6,328 A. only and a second laser oscillation condition at 6,401 A. only, and wherein the spacing between said mirrors is such that said first laser oscillation condition will normally be provided and wherein said second laser oscillation condition will be provided when any one of said segments is disposed in said laser cavity.

* * * * *